(12) United States Patent
Nunna et al.

(10) Patent No.: US 10,979,307 B2
(45) Date of Patent: Apr. 13, 2021

(54) SYNCHRONIZED DISTRIBUTED PROCESSING IN A COMMUNICATIONS NETWORK

(71) Applicant: B.yond, Inc., Frisco, TX (US)

(72) Inventors: Madhu Nunna, Reston, VA (US);
Rikard Kjellberg, Soquel, CA (US);
Johnny Ghibril, Boston, MA (US);
Santiago Molina, Córdoba (AR);
Bruno Morel, Montréal (CA)

(73) Assignee: B.yond, Inc., Frisco, TX (US)

( * ) Notice: Subject to any disclaimer, the term of this patent is extended or adjusted under 35 U.S.C. 154(b) by 0 days.

(21) Appl. No.: 16/399,844

(22) Filed: Apr. 30, 2019

(65) Prior Publication Data

US 2019/0342183 A1 Nov. 7, 2019

Related U.S. Application Data

(60) Provisional application No. 62/665,406, filed on May 1, 2018.

(51) Int. Cl.
| *G06F 15/173* | (2006.01) |
| *H04L 12/24* | (2006.01) |
| *H04L 29/06* | (2006.01) |
| *G06N 20/00* | (2019.01) |

(52) U.S. Cl.
CPC ............ *H04L 41/16* (2013.01); *G06N 20/00* (2019.01); *H04L 41/147* (2013.01); *H04L 63/1416* (2013.01)

(58) Field of Classification Search
CPC ... G06N 20/00; H04L 41/147; H04L 63/1416; H04L 65/60; H04L 65/607; H04L 65/608; H04L 45/02; H04L 67/2842; H04L 67/10; H04L 41/16; H04L 41/145; H04W 12/002
See application file for complete search history.

(56) References Cited

U.S. PATENT DOCUMENTS

| 10,560,510 B2* | 2/2020 | Li ......................... H04L 67/327 |
| 2003/0055796 A1 | 3/2003 | Shetty et al. |
| 2012/0310785 A1 | 12/2012 | Poulin |
| 2013/0346496 A1 | 12/2013 | Maarek et al. |
| 2014/0181967 A1* | 6/2014 | Dondeti .............. H04L 63/1408 726/22 |
| 2014/0207912 A1* | 7/2014 | Thibeault ............ H04L 67/2847 709/219 |

(Continued)

FOREIGN PATENT DOCUMENTS

WO WO 2015/193776 A1 12/2015

OTHER PUBLICATIONS

PCT International Search Report and Written Opinion, PCT Application No. PCT/US2019/030060, dated Aug. 9, 2019, 10 pages.

*Primary Examiner* — Ryan J Jakovac
(74) *Attorney, Agent, or Firm* — Fenwick & West LLP (57) ABSTRACT

A system and a method are disclosed for implementing distributed processing in edge nodes. In an embodiment, a respective edge node receives data from a client of the respective edge node. The respective edge node generates a prediction of a respective activity based on the data, and determines whether the prediction is valid by feeding the prediction into a validator module and receiving a validation response from the validator module. The respective edge node, in response to determining that the prediction is valid, activates a function.

14 Claims, 5 Drawing Sheets

(56) References Cited

U.S. PATENT DOCUMENTS

| | | | |
|---|---|---|---|
| 2015/0046564 A1* | 2/2015 | Kim | H04L 67/10 |
| | | | 709/217 |
| 2015/0074392 A1* | 3/2015 | Boivie | H04L 63/0428 |
| | | | 713/164 |
| 2017/0097860 A1 | 4/2017 | Pang | |
| 2018/0308001 A1* | 10/2018 | Doddala | H04L 41/14 |
| 2019/0036716 A1* | 1/2019 | Kasaragod | H04L 63/104 |
| 2019/0318268 A1* | 10/2019 | Wang | G06N 20/00 |
| 2020/0090314 A1* | 3/2020 | Mayr | G06N 20/00 |
| 2020/0311573 A1* | 10/2020 | Desai | G06Q 10/06315 |

\* cited by examiner

SYNCHRONIZED DISTRIBUTED PROCESSING IN A COMMUNICATIONS NETWORK

CROSS REFERENCE TO RELATED APPLICATIONS

This application claims the benefit of U.S. Provisional Application No. 62/665,406, filed May 1, 2018, the disclosure of which is hereby incorporated by reference herein in its entirety.

TECHNICAL FIELD

This disclosure generally relates to the field of creation and management of distributed systems on a communications network.

BACKGROUND

Communications systems are designed with a centralized architecture for training a model and using the model to output predictions. In such systems, to train the model, as intermediate nodes and edge nodes receive or generate data, that data is propagated to a central database. The central database of such systems thus involves massive storage capacity for storing data from, e.g., a nationwide communications infrastructure, in perpetuity. The model is trained based on this wealth of data to inform and validate predictions for newly received data.

Such systems suffer from several disadvantages. First, because the model is trained using years of persistently stored data, huge amounts of storage capacity must be maintained, which may become prohibitively expensive as time passes and more data is collected. Further, such centralized systems fail to finetune for local conditions. For example, a centralized system for the state of California fails to finetune validation decisions for microclimate temperature variations (e.g., snow in Lake Tahoe and extreme heat in Death Valley), geographic-specific communications activity (e.g., cell phone use patterns in a dense city like San Francisco versus in a rural environment such as Napa), and the like. As yet another disadvantage, because these systems require years of training data to accurately validate predictions, the training data is largely a static model that does not move when sudden shifts that represent a small amount of a data pool (but a large amount of recently received data) occur.

In such implementations, it is not possible to simply take existing predictor and tuner functionality and move this functionality to edge nodes. The high computational requirements of the related art implementations require extremely high computational power (e.g., from graphical processing unit (GPU) structures) that is prohibitively expensive and impractical to implement at edge nodes. Moreover, the related art implementations cannot be applied to edge nodes because these edge nodes do not have large data lakes, and instead collect data non-persistently, and thus, validation models would be uninformed if wholesale-moved to edge nodes.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments disclosed herein relate to decentralizing activity prediction validation models, moving them from a central processor to, e.g., an edge node. To this end, systems and methods are provided herein for implementing distributed processing in edge nodes. For example, a network may have a plurality of edge nodes (e.g., a node in each city, or several nodes in each city). Each respective edge node of the plurality of edge nodes may receive data from a client (e.g., a consumer device such as a mobile phone or a laptop, or a cloud device such as a network server that hosts or facilitates streaming of media). In response to receiving the data, the edge node receiving the data may generate a prediction of a respective activity based on the data. For example, the edge node may predict that the activity relates to a cyber attack, or relates to a norm in media streaming habits (e.g., a particular video is likely to be streamed next, such as a next episode of a series). The edge nodes may then determine whether the prediction is valid by feeding the prediction into a validator module and receiving a validation response from the validator module. In an embodiment, the validator module sits hierarchically above the edge node and is shared across several edge nodes (e.g., nodes that share similar microconditions and thus that don't require individual fine-tuning). In response to determining that the prediction is valid, the edge nodes may activate a function (e.g., alert other edge nodes to a predicted cyber attack).

Exemplary Architecture with Centralization of Components

Figure 1:
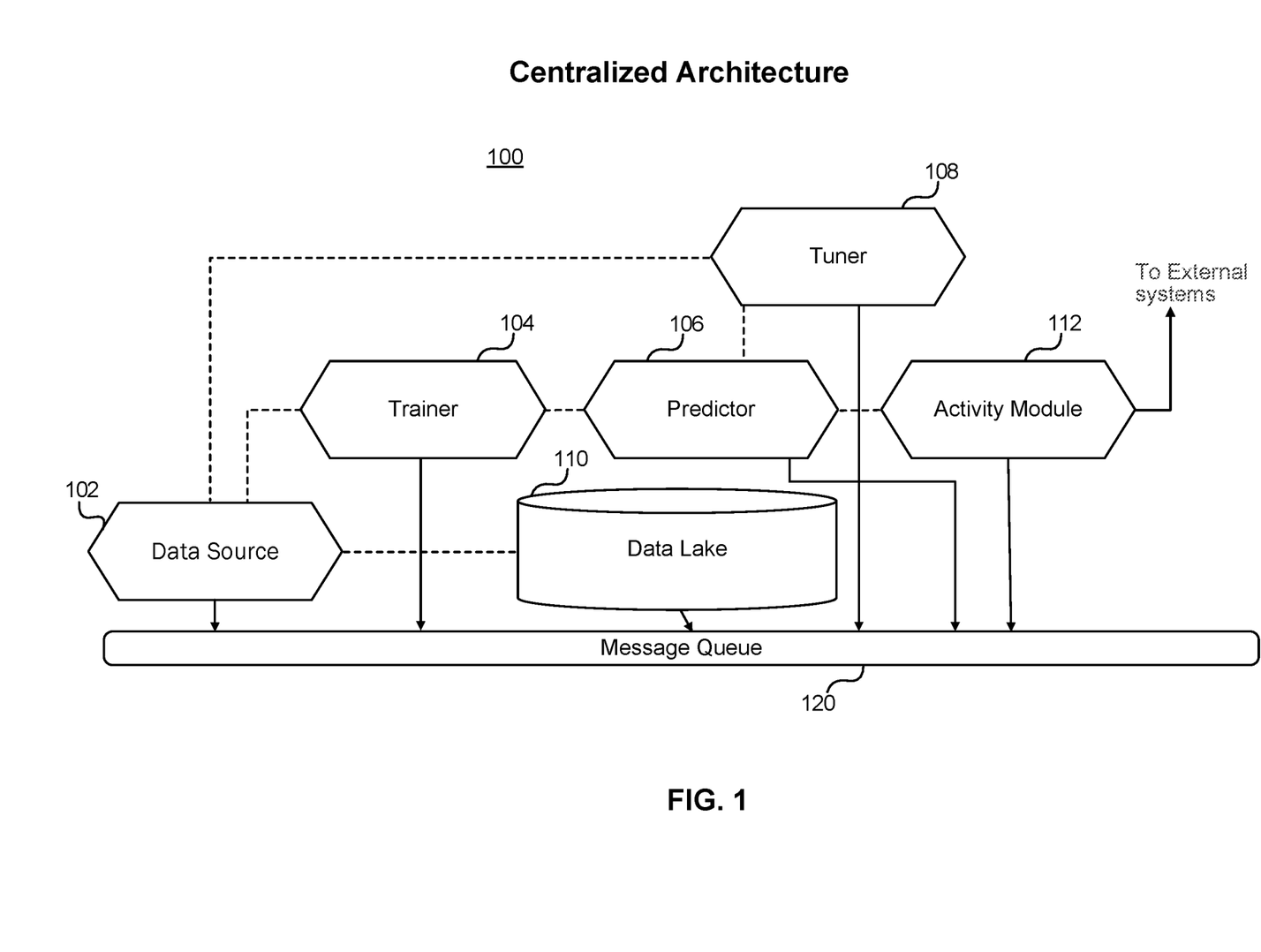
FIG. 1 illustrates one embodiment of an exemplary system configuration with some components integrated into a centralized architecture.

Figure (FIG. 1 illustrates one embodiment of an exemplary system configuration with some components integrated into a centralized architecture. As depicted in FIG. 1, system 100 includes data source 102, trainer 104, predictor 106, tuner 108, data lake 110, and activity module 112, as well as message queue 120 for facilitating messaging from/between each component of system 100. System 100 receives data from clients (e.g., consumer devices such as mobile phones, laptops, etc., and/or cloud and network devices such as servers, CDN components, etc.) via data source 102, which may be connected to a network. The received data may be stored to data lake 110.

Trainer 104 may be a software module stored at a storage unit within system 100 (e.g., storage unit 416, as discussed below with respect to FIG. 4). Trainer 104 takes, as input, data received via data source 102. In an embodiment, trainer 104 may receive the data from data source 102. In another embodiment, trainer 104 may retrieve the data from data lake 110. Trainer 104 may utilize the data to train a machine learning model to generate predictions about activity to which incoming data corresponds (e.g., using a deep neural network). Predictor 106 may be a trained model obtained from trainer 104. As an example, the predictor may used to predict any network activity, such as network congestion, network element failures, traffic demand, user behavior, or any network key performance indicators (KPI). More specifically, a user behavior predictor could be trained to predict which videos users in a given area will need to play next and which ones of those will need to be cached (e.g., in an edge content delivery network (CDN) node or in a core (e.g., centralized) CDN node). Trainer 104 may regenerate, or update, predictor 106 as more data is received via data source 102. Advantageously, if regenerated or updated predictor 106 becomes more informed over time as more data is used to train predictor 106. However, as more data is used to train predictor 106, more storage capacity is required in data lake 110, and predictor 106 becomes more static and inflexible to change in network behavior.

Tuner 108 may be a software module stored at a storage unit within system 100 (e.g., storage unit 416, as discussed below with respect to FIG. 4). Tuner 108 is used by system 100 to validate the output of predictor 106. In an embodiment, initially, tuner 108 is trained in a similar manner to predictor 106 (e.g., using a deep neural network in a similar manner to which trainer 104 is used to train predictor 106). When being executed, tuner 108 and predictor 106 may each receive a copy of observed data (e.g., copies of a same observation, delivered in real time to both predictor 106 and tuner 108). Tuner 108 will, in a similar fashion to predictor 106, output a prediction of network activity based on its training data. Tuner 108 receives predictions of predictor 106, and compares the prediction formed by tuner 108 to the prediction received from predictor 106 from the same observation.

The predictions formed by tuner 108, or predictor 106, may include a predicted network observation, resulting actions from system components, and responses to those resulting actions. After being trained, tuner 108 (and/or predictor 106) may form a rules database, where predicted network observation, resulting actions, and responses to those resulting actions are mapped. For example, if certain observational data results in a prediction to take action to reduce dropped packets, this may be mapped to a resulting action to increase a buffer size (e.g., because packets were being dropped due to buffers reaching capacity). This may also be mapped to a result of fewer packets actually being dropped. In an embodiment, when predictor 106 makes a prediction that does not match a prediction of tuner 108 (e.g. if the prediction was to reduce dropped packets, action was to increase buffer size and the result was more dropped packets, which does not match the entry of a rules database as described above), tuner 108 may responsively crawl the ecosystem coupled to system 100 for observed data intent and a more successful response from other predictors or policy rule engines (e.g., responses from other predictors that match the entries of the relational database of trained tuner 108) and may adjust the predictions from predictor 106. Tuner 108 may adjust the predictions from predictor 106 by replacing the predictions of predictor 106 with the more successful response and command network activity based on the adjustment, and/or may feed back the more successful response to predictor 106 and/or trainer 104 to improve predictor 106 and cause the more successful response to be predicted when a similar observation is detected in the future.

In response to receiving validation of the output of predictor 106, the output of predictor 106 is passed to activity module 112, which activates a network function (e.g., command edge CDN node to cache predicted video to be played next). The term function, interchangeably used with network function herein, as used herein may refer to any network activity that facilitates or blocks data communications. As another example, the network function may be to block all communications from a particular Internet Protocol (IP) address when a cybersecurity attack is predicted and validated from that particular IP address.

Distributed Architecture with Tuner in Edge Nodes

Figure 2:
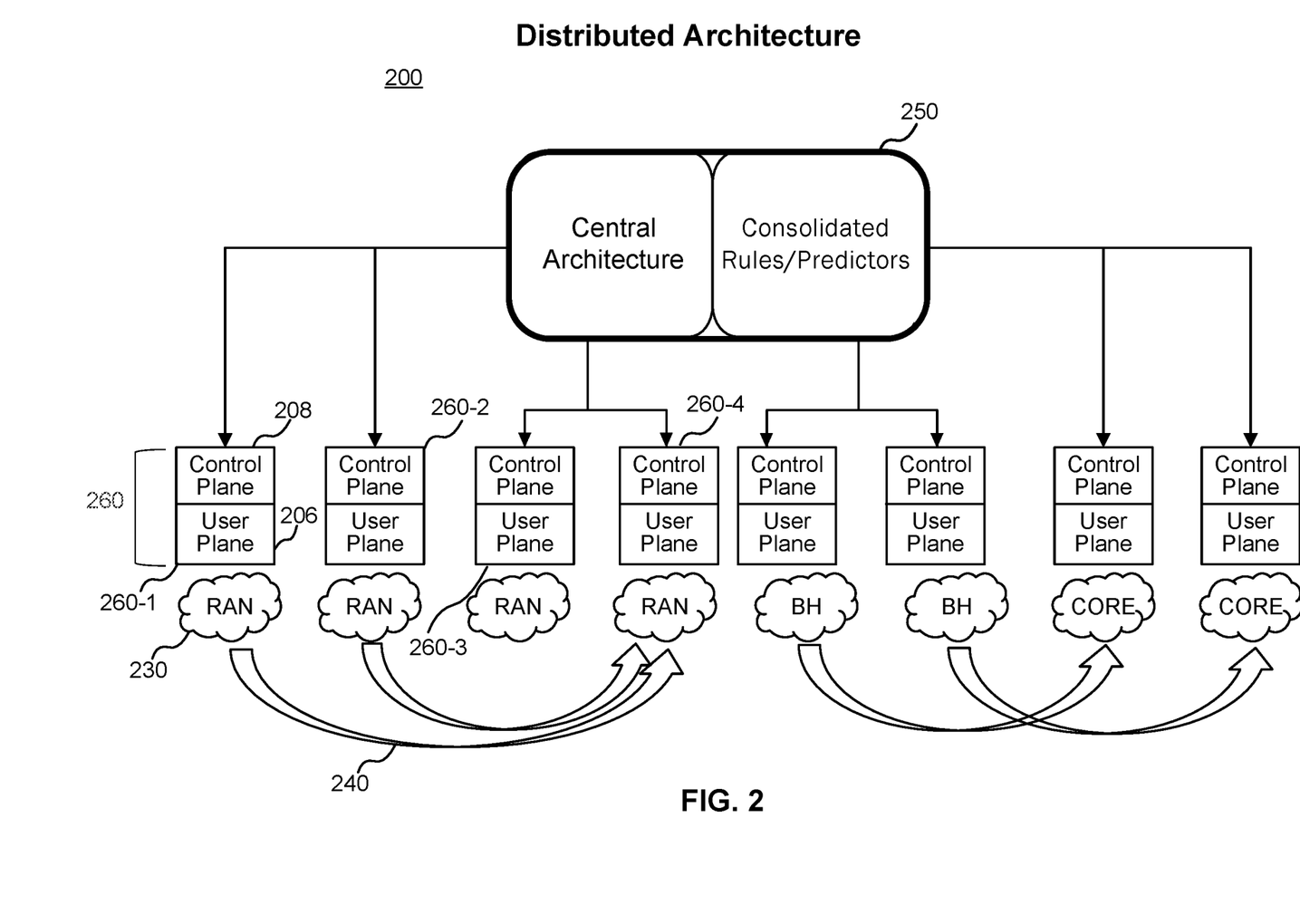
FIG. 2 illustrates one embodiment of an exemplary system configuration with some components distributed to a plurality of edge nodes.

FIG. 2 illustrates one embodiment of an exemplary system configuration with some components distributed to a plurality of edge nodes. System 200 includes central architecture 250 and edge nodes 260. Each edge node 260 includes control plane 208 and user plane 206. The term edge node, as used herein, may refer to a node of a network that directly communicates with, or facilitates communication with, client devices. An edge node, for example, may be a cell site or base station that facilitates wireless communications. User plane 206 includes, similar to the rules database described with respect to claim 1, a database referencing a set of rules. The set of rules are determined using past predictions by a predictor. The past predictions may be populated by a predictor of the same edge node (e.g., the predictor being located at control plane 208 of the edge node), a predictor of a different edge node, or a predictor of central architecture 250. An advantage of using a pre-populated rules database, as opposed to a predictor 106, in the edge node, is that user plane 206 is configured to respond to recognizable situations in an extremely fast manner, as no machine learning model is needed to compute a result.

User plane 206 may start off as a including a set of rules that are a result of past predictions/actions by a centralized trainer of central architecture 250, such as trainer 104 of system 100, and may be propagated to user plane 206 by central architecture 250. Thus, user plane 206 may be informed by a network-wide data lake, such as data lake 110. Control plane 208 may include a predictor similar to 106 in FIG. 1. Where an observation received by user plane 206 does not match a rule of the rules database of user plane 206, the edge node may push the observation to control plane 208 for processing by the predictor and a validator module.

Control plane 208 of edge nodes 260 includes a validator module. The validator module of control plane 208 has similar functionality to tuner 108, with the critical difference being that the validator module is finetuned for nuances specific to particular edge node 260 in which control plane 208 sits. As an example of fine-tuned validation, edge node 260-1 may be in an urban region, such as San Francisco, and edge node 260-2 may be in a rural region, such as Napa. Consumer habits in San Francisco may be to binge watch videos, and thus to view an episode of a media series, and then to view a next episode of the media series. Consumer habits in Napa, however, may be to watch one video at a time, and then discontinue streaming of videos. Thus, while user plane 206 of both edge nodes 260-1 and 260-2 may predict that a next episode is to be streamed (and thus should be cached by a local node of a CDN), control plane 208, if trained based on local observations as described herein, would validate the prediction for edge node 260-1, but invalidate the prediction for edge node 260-2. In an embodiment, control plane 208 may feed back the invalidation to user plane 206 of edge node 260-2, to train user plane 206 to change its prediction the next time a similar scenario arises. While not depicted, as data is received by edge nodes 260, that data is temporarily stored by the edge node at which it was received. The edge nodes may each use the data to train their respective control plane 208 to more accurately validate results. Each control plane 208 of edge nodes 260 is trained using this transient data before the data is discarded. For example, a reinforced neural network (RNN) implemented at a particular node may take the data as input, and may output to the validation module a change, or reinforcement, to existing validation mappings in the validation module.

In an embodiment, the RNN treats a problem space as a classification problem and may use a guess-the-action approach in a sequential decision-making process. For each observed data set (e.g., a network event), the RNN performs a classification action under the guidance of a policy, derived from the purpose of each edge node. A purpose of a node may be assigned by an administrator and stored at the edge node itself, or in a data structure of central architecture 250. A purpose, as used herein, may refer to a primary function of an edge node. Example purposes may include hosting emergency applications, combatting cyber attacks, delivering streaming media, and the like. A classification action is an activity that relates to the purpose. For example, an edge that hosts emergency applications will have reliability and availability as its critical policies, and the classification may relate to these policies, such as a policy to ensure a high level of reliability. The edge node may determine whether the model predicts an action that improves the policy guidance (e.g., 999.99 reliable), and may, responsive to detecting that the policy guidance is improved, give the action a positive reward, otherwise, it will be given a negative reward. The model may weight rewards differently, where rewards for critical policy improvements are weighted with more emphasis than rewards for non-critical policy improvements. For example, following the emergency application example, optimizing burst data rate is a non-critical policy. Thus, detecting that burst data rate will be optimized will result in a smaller reward than a reward given for a critical policy improvement. A model will be considered as ready, if it crosses a threshold of rewards in a predefined period of time (e.g., a single day). The threshold may be determined based on edge specific policy (e.g. a high threshold may be applied for edges supporting mission critical application, and a low threshold may be applied for less critical applications, such as edges running gaming applications.

Central architecture 250 may include general management features included further up the node hierarchy from edge nodes, and may additionally include consolidated rules and/or predictors. For example, network traffic that implicates more nodes than the edge nodes may be fed to, in addition to the edge node predictors of user planes 206, predictors in interstitial nodes or a central node of central architecture 250 for additional predictions and tuning on further activity.

Coordination and Cross-Pollination Across Edge Nodes

Referring still to FIG. 2, in some embodiments, various edge nodes may be correlated. System 200 may determine that the edge nodes 260 are correlated based on an analysis of shared attributes between the edge nodes 260. A non-exhaustive set of examples of attributes of edge nodes 260 that may lead to a determination that edge nodes 260 are correlated may be use of the same type of network 230 (e.g., edge nodes 260-1 through 260-4 all use a Random Access Network ("RAN"); edge nodes 260 may share a particular weather pattern (e.g., microclimate, where weather, temperature, etc., are similar); edge nodes 260 may share a similar subscriber makeup (e.g., based on demographics, streaming habits, commonly used applications, tendency of users to access sites or applications the users haven't accessed before, etc.); and the like.

To determine whether the edge nodes are correlated, system 200 (e.g., at central architecture 250, at an edge node 260, or using distributed processing) may determine, within or across attributes, whether a sufficient amount of attributes overlap between various ones of edge nodes 260, or whether a particular attribute or particular attributes overlap, as may be defined by an administrator or determined by a model (e.g., a machine learning model trained to determine correlations between edge nodes and output whether the edge nodes are correlated or not). System 200 may determine that edge nodes 260-1 and 260-4 are correlated, for example, and may share information from edge node 260-1 to edge node 260-4, and vice versa, as depicted by data flow 240. System 200 may determine not only whether edge nodes are correlated, but a manner in which the edge nodes are correlated (e.g., based on what attribute(s) led to the determination of the correlation), and may curate what data is to be shared by data flow 240 between the nodes. For example, if video consumption habits are correlated, but application usage is not correlated, then data flow 240 may include cross-pollination of a newly detected video consumption habit from edge node 260-1 to edge node 260-4, but may exclude newly detected application usage from data flow 240.

In an embodiment, correlation may also be made to a group of edge nodes. Following the above example of two correlated nodes, 260-1 and 260-4, the system may also determine whether neighboring nodes of 260-1 and 260-4 correlate. As used herein, the term neighboring nodes may be refer to nodes within a certain distance (e.g., a predefined number of hops, such as one hop). The system may store a network topology in a connected graph where connections may be physical (wireless or wired), virtual, or logical, and may determine which nodes are neighbored based on the stored topology. The system may determine whether one or more neighbors of a given edge node correlate to that edge node, and in response to determining that one or more neighbors correlate, the system may propagate an observation to those neighbors. This propagation is advantageous, as it allows rapid deployment of distributed intelligence to large networks. For example, 40 sites in north London may be correlated to those in downtown San Francisco, and those 40 sites may rapidly have rules and observations propagated to them based on activity detected in downtown San Francisco.

In an embodiment, the correlated node groups may vary based on policy criteria, such as security, resource utilization, system uptime etc. For example, north London could be correlated to downtown San Francisco on access security whereas it is correlated to Capitol district in Washington D.C. for access security. Thus, when correlations are based on a limited number of dimensions (e.g., access security only), observations may be propagated when the observations are relevant to the particular dimension corresponding to the correlation. In an embodiment, correlation could be stronger or weaker for two neighboring nodes versus those across a large geographical barrier, and propagation of observations may vary based on strength of correlation. The system may generate a correlation map, e.g., by maintaining a graph that indicates dimensions on which nodes of the network map are correlated. The correlation map may be dynamic; system 200 may continuously update the graph, e.g., as data from network forces and/or market forces are observed. An example of a market force may include introduction of next generation of smart phones. An example of a network force may be loss of network resources in one area resulting in changed traffic patterns in surrounding areas.

Figure 3:
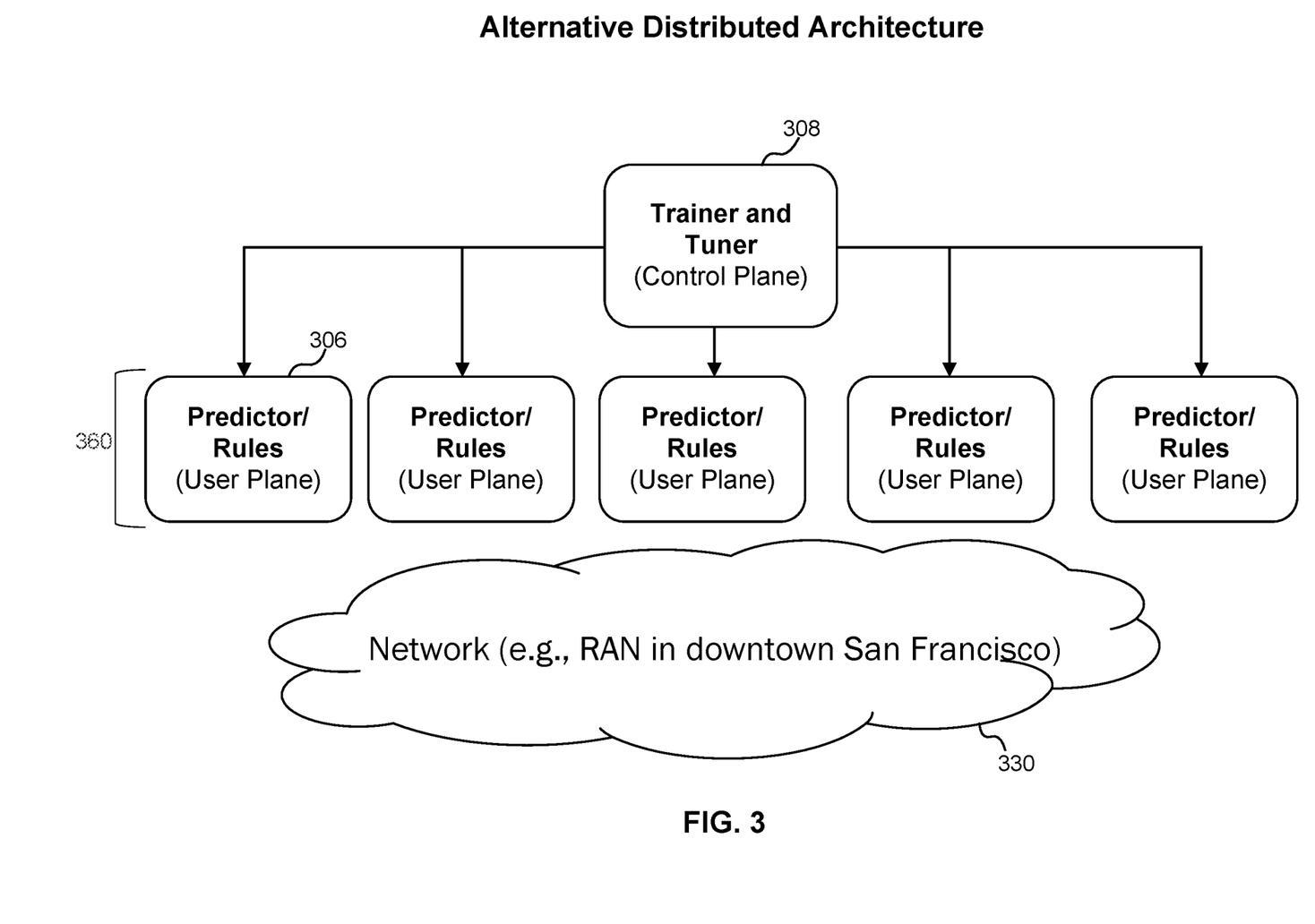
FIG. 3 illustrates one embodiment of an exemplary system configuration with some components distributed to a plurality of edge nodes, and some components centralized as common between the plurality of edge nodes.

FIG. 3 illustrates one embodiment of an exemplary system configuration with some components distributed to a plurality of edge nodes, and some components centralized as common between the plurality of edge nodes. System 300 includes edge nodes 360 that each include a predictor 306 (e.g., as part of a user plane, as described above), as well as a centralized control plane 308 (e.g., including a trainer and tuner). The centralized control plane may be a next hop from each of edge nodes 360. As discussed above, some edge nodes may be correlated in some respects. In an embodiment, system 300 determines that edge nodes 360 are highly correlated (e.g., because a high threshold of attributes match across each of edge nodes 360). This may occur, for example, where edge nodes 360 are distributed near one another (e.g., in a dense urban area where edge nodes may be needed on every city block to handle high network usage, and where commonalities in weather, usage, etc., are very high). As another example, centralized control plane 308 may be used for edge nodes 360 that are implemented by a third party, rather than a provider of systems 100-300, and thus do not benefit from a control plane of network 300. Centralized control plane 308 validates predictions from predictors 306 of each edge node 360 in the same manners as described above, with the difference being that centralized control plane 308 is shared across edge nodes, rather than implemented individually in each of edge nodes 360 (e.g., as performed in system 200 of FIG. 2). The predictions of predictors 306 are driven based on data received from network 330 (which, e.g., may be a network in a dense urban city such as downtown San Francisco).

Additional Applications of Decentralized Architecture

In an embodiment, a new edge node will be activated, and will not yet have a fine-tuned predictor and/or tuner that is specific to nuances of that edge node. For example, a communications company may add a new cell site to a cellular communications network, and a tuner of that cell site may not yet be trained. In order to initialize a validation module of the control plane of the new edge node, a system (e.g., a node of system 200) may identify a subset of the plurality of edge nodes comprising common attributes that are common with respect to attributes of the respective edge node, in the manner described above. System 200 may retrieve respective models for each respective edge node of the subset (e.g., models of validator modules of control planes of edge nodes 260-1 and 260-3, if edge node 260-4 is a new edge node). System 200 may weight aspects of each respective model. For example, system 200 may weight aspects that are unique to edge nodes 260-1 and 260-3 highly (e.g., unique application usage), and aspects that are common among many of edge nodes 260 with a lower weight (e.g., common video streaming usage). System 200 may rank each respective aspect of each respective model based on the weighting, and may initialize the validator module of the new edge node (e.g., edge node 260-4) by generating a machine learning model (e.g., validator module) comprising aspects selected based on the ranking. The multi-edge node correlation process described in the foregoing facilitates such ranking methodology. When a new edge node is added to the network, system 200 will utilize the correlation map and identify the node with the highest rank. While little may be known about a new edge node, a purpose may be defined for the new edge node, and location will be known as well. These attributes alone may be used to identify a highest ranking node based on correlation, or may be adjoined with other known attributes. The highest ranking node may be a neighbor, in the same city, or across the world.

While the bulk of the disclosure is described with respect to moving tuner and predictor functionality to the control and user planes of edge nodes, respectively, hierarchical implementation may be used in a similar manner. For example, some large geographical errors may have root nodes for those areas (e.g., a root node for the San Francisco market, a root node for the New York City market, a root node for the Paris market, etc.). Correlations may be determined across these root nodes, and the system (e.g., system 200) may determine that these root nodes are highly correlated with respect to a particular attribute. When new activity is detected with respect to that attribute (e.g., a new streaming application is released and users in San Francisco have been using far more bandwidth than previously used), network congestion predictions, for example, may be propagated to highly correlated markets (e.g., New York city and Paris) to inform, e.g., a tuner for a Paris root node to invalidate a low network congestion prediction.

In an embodiment, it may be advantageous for cross-coordination and cross-pollination of data (e.g., tuner data) to be shared across providers (e.g., ATT, VERIZON, VODAFONE, etc.). System 200 may be configured to normalize data for sharing across providers. For example, system 200 may identify confidential information in data (e.g., a cell cite identifier that identifies where the data originated from), while retaining non-confidential data (e.g., temperature variation, network KPIs, etc.). System 200 may share the non-confidential data between providers. In an embodiment, providers may propagate such data where one provider has predicted and validated a cybersecurity issue; nodes at different providers sharing similar attributes to the node at which the cybersecurity issue was validated may be determined through correlations, as discussed above, and informed so as to activate functions to prepare for similar attacks.

While the methods and systems disclosed herein are described with respect to communications networks, these methods and systems are generally applicable to other networks as well (e.g., automobile networks).

Computing Machine Architecture

Figure 4:
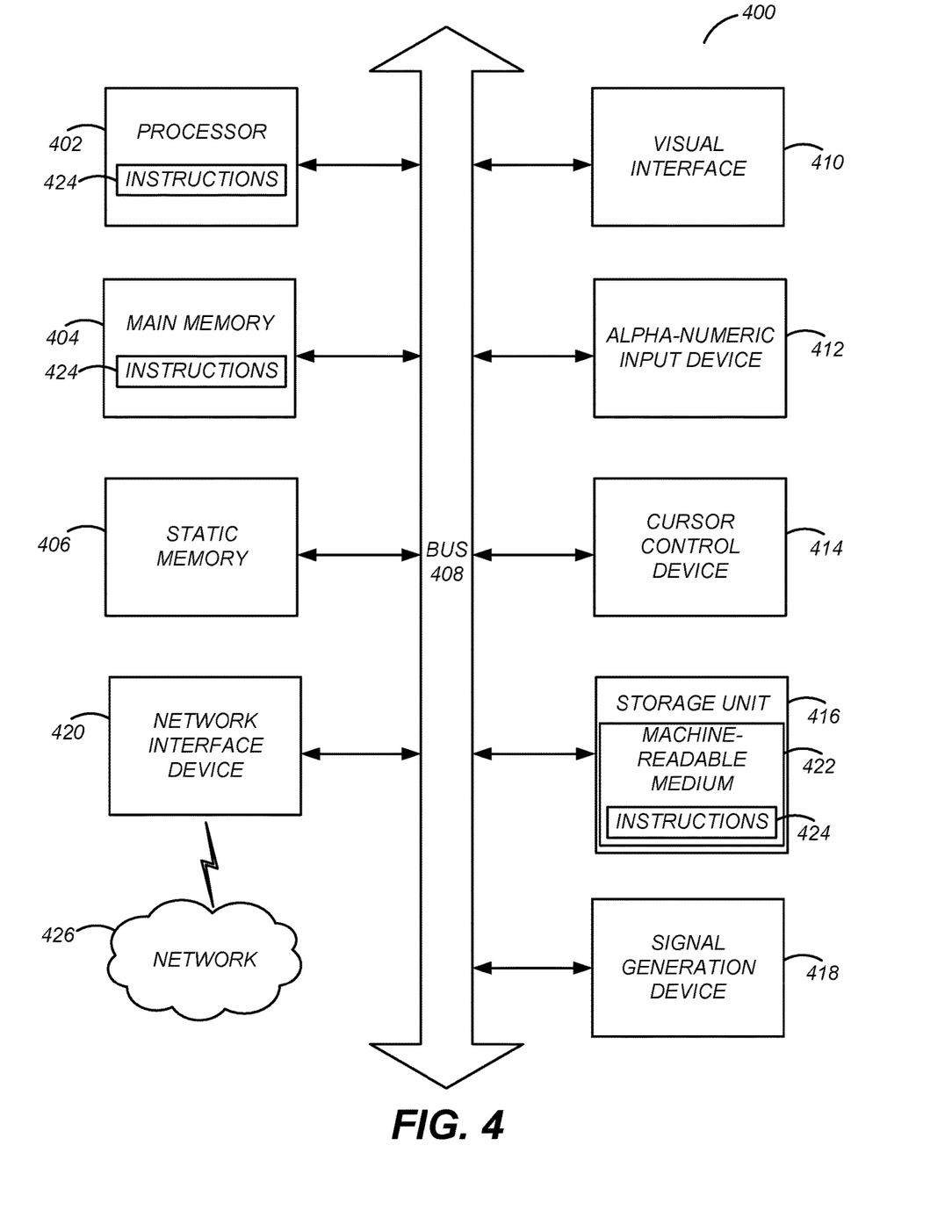
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. For example, one or more computer systems 400 may form or execute some or all of system 100, centralized architecture 250, edge nodes 260 and 360, control plane 308, etc. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Process for Implementing Distributed Network

Figure 5:
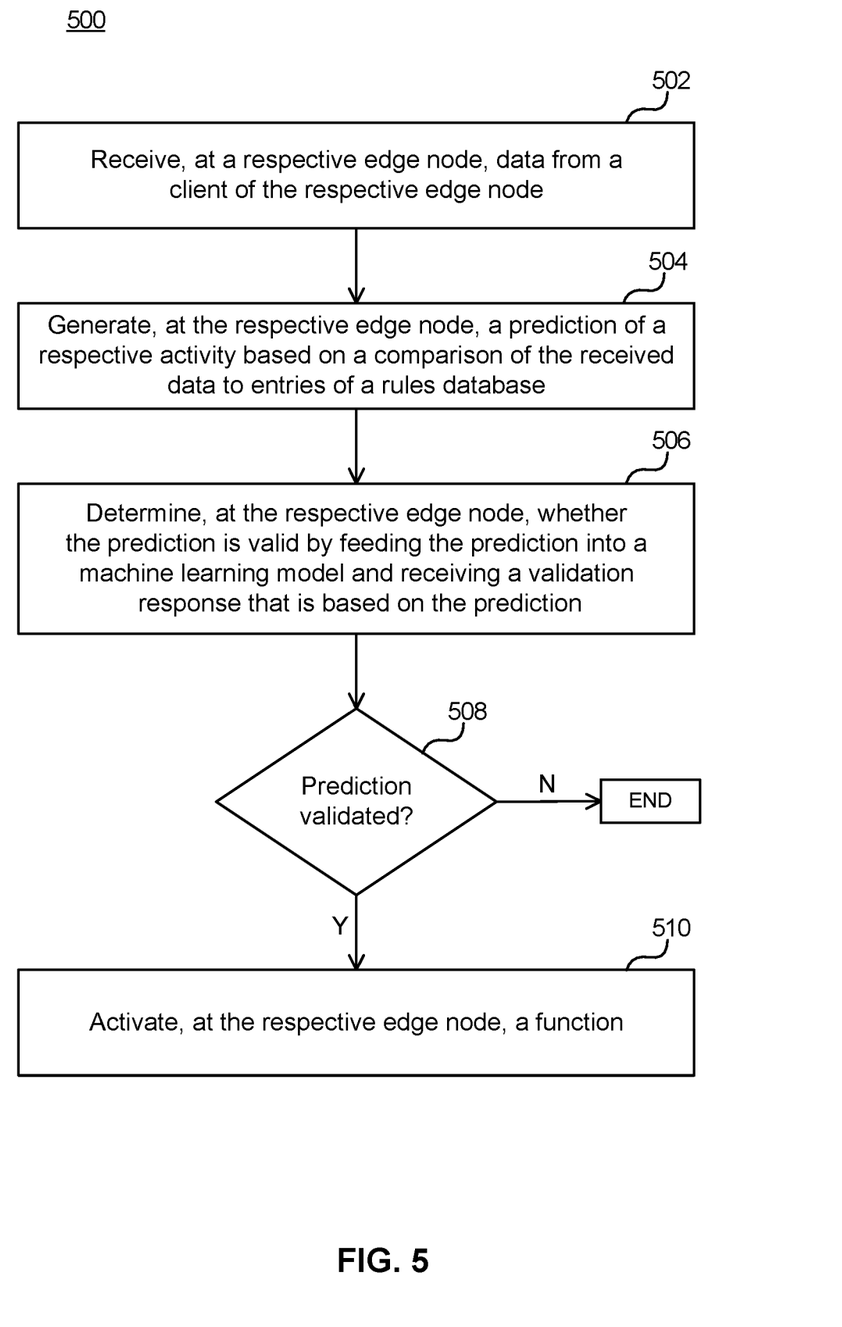
FIG. 5 illustrates one embodiment of a flowchart for implementing distributed processing in a network.

FIG. 5 illustrates one embodiment of a flowchart for implementing distributed processing in a network. Process 500 applies to a plurality of edge nodes (e.g., edge nodes 260), each acting in parallel as data is received. A respective edge node of the plurality of edge nodes (e.g., edge node 260-1) receives 502 data from a client of the respective edge node (e.g., from a mobile device of a user). The respective edge node (e.g., edge node 260-1) generates 504 a prediction (e.g., using user plane 206, which incorporates a predictor such as predictor 106) of a respective activity based on a comparison of the data to entries of a rules database (e.g., a prediction that the user will request a particular video for streaming in fifteen minutes based on a mapping of the data to such a prediction in a rules database).

The respective edge node (e.g., edge node 260-1) determines 506 whether the prediction is valid by feeding the prediction into a machine learning model (e.g., a validator module of control plane 208) and receiving a validation response from the machine learning model. If the respective edge node determines 508 that the prediction is not validated, then process 500 ends. If the respective edge node determines 508 that the prediction is validated, the respective edge node activates 510, at the respective node, a function (e.g., request the particular video be cached at a particular server of a CDN).

As described above with respect to FIG. 2, edge node 260-1 may have limited storage capacity. Accordingly, edge node 260-1 may store the data to memory for the purposes of feeding the data as training data to a machine learning model (e.g., a reinforced learning model) of the validator module (e.g., trainer 104, as implemented within edge node 260-1), where the validation response is derived comprises obtaining output from the machine learning model. Edge node 260-1 may then delete the data from its memory.

As described above with respect to FIG. 2, for the purpose of cross-pollenating information, in response to determining that the prediction is valid, edge node 260-1 whether the respective activity is novel. The term "novel," as used herein, is interchangeably used with the term "unique." An activity may be referred to as novel where the activity is unobserved, by edge node 260-1, and/or by any of edge nodes 260. In response to determining that the respective activity is novel, edge node 260 identifies a subset of nodes that correlate to the respective node. As described above, the correlation may be with respect to attributes of the respective activity, or may be with respect to a plurality of attributes including, and/or excluding, attributes of the respective activity. Edge node 260 may propagate the determination of validity to the subset of nodes. In an embodiment, cross-pollination/propagation of information may be performed in predefined circumstances (e.g., where the activity relates to cyber security, and where additional nodes correlate to the respective node). In an embodiment, as described above, confidential data may be identified and obscured from propagated information prior to propagating the information.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein (e.g., operations of control plane 208).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for implementing synchronized distributed processing in a communications network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for implementing distributed processing in edge nodes, the method comprising:
for each respective edge node of a plurality of edge nodes:
receiving, at the respective edge node, data from a client of the respective edge node;
storing the received data to memory of the respective edge node;
generating, at the respective edge node, a prediction of a respective activity based on the received data;
determining, at the respective edge node, whether the prediction is valid by feeding the prediction into a machine learning model and receiving a validation response from the machine learning model, wherein the machine learning model is generated by:
identifying a subset of the plurality of edge nodes comprising common attributes that are common with respect to attributes of the respective edge node;

retrieving respective models for each respective edge node of the subset;
weighting aspects of each respective model;
ranking each respective aspect of each respective model based on the weighting; and
initializing the machine learning model for the respective edge node by generating a machine learning model comprising aspects selected based on the ranking;
feeding the received data as training data to the machine learning model;
responsive to having trained the machine learning model using the received data, deleting the received data from the memory of the respective edge node; and
in response to determining that the prediction is valid, activating, at the respective edge node, a function.

2. The method of claim 1, wherein the machine learning model comprises a reinforced learning model.

3. A method for implementing distributed processing in edge nodes, the method comprising:
for each respective edge node of a plurality of edge nodes:
receiving, at the respective edge node, data from a client of the respective edge node;
storing the received data to memory of the respective edge node;
generating, at the respective edge node, a prediction of a respective activity based on the received data;
determining, at the respective edge node, whether the prediction is valid by feeding the prediction into a machine learning model and receiving a validation response from the machine learning model;
feeding the received data as training data to the machine learning model;
responsive to having trained the machine learning model using the received data, deleting the received data from the memory of the respective edge node;
in response to determining that the prediction is valid, activating, at the respective edge node, a function;
in response to determining that the prediction is valid, determining whether the respective activity is novel;
in response to determining that the respective activity is novel:
identifying a subset of nodes that correlate to the respective node; and
propagating the determination of validity to the subset of nodes.

4. The method of claim 3, wherein determining whether the respective activity is novel further comprises determining that the respective activity relates to cyber security.

5. The method of claim 3, wherein propagating the determination of validity to the subset of nodes comprises:
identifying confidential information in data to be propagated; and
obscuring the confidential data from the data to be propagated.

6. A system comprising for implementing distributed processing in edge nodes, the system comprising:
a non-transitory computer-readable medium with instructions encoded thereon for implemented distributed processing in edge nodes; and
a processor configured, based on execution of the instructions, to, for each respective edge node of a plurality of edge nodes:
receive, at the respective edge node, data from a client of the respective edge node;
store the received data to memory of the respective edge node;
generate, at the respective edge node, a prediction of a respective activity based on the received data;
determine, at the respective edge node, whether the prediction is valid by feeding the prediction into a machine learning model and receiving a validation response from the machine learning model, wherein the machine learning model is generated by:
identifying a subset of the plurality of edge nodes comprising common attributes that are common with respect to attributes of the respective edge node;
retrieving respective models for each respective edge node of the subset;
weighting aspects of each respective model;
ranking each respective aspect of each respective model based on the weighting; and
initializing the machine learning model for the respective edge node by generating a machine learning model comprising aspects selected based on the ranking;
feed the received data as training data to the machine learning model;
responsive to having trained the machine learning model using the received data, delete the received data from the memory of the respective edge node; and
in response to determining that the prediction is valid, activate, at the respective edge node, a function.

7. The system of claim 6, wherein the machine learning model comprises a reinforced learning model.

8. A system comprising for implementing distributed processing in edge nodes, the system comprising:
a non-transitory computer-readable medium with instructions encoded thereon for implemented distributed processing in edge nodes; and
a processor configured, based on execution of the instructions, to, for each respective edge node of a plurality of edge nodes:
receive, at the respective edge node, data from a client of the respective edge node;
store the received data to memory of the respective edge node;
generate, at the respective edge node, a prediction of a respective activity based on the received data;
determine, at the respective edge node, whether the prediction is valid by feeding the prediction into a machine learning model and receiving a validation response from the machine learning model;
feed the received data as training data to the machine learning model;
responsive to having trained the machine learning model using the received data, delete the received data from the memory of the respective edge node;
in response to determining that the prediction is valid, activating, at the respective edge node, a function;
in response to determining that the prediction is valid, determine whether the respective activity is novel;
in response to determining that the respective activity is novel:
identify a subset of nodes that correlate to the respective node; and
propagate the determination of validity to the subset of nodes.

9. The system of claim 8, wherein the processor is further configured, when determining whether the respective activity is novel further, to determine that the respective activity relates to cyber security.

10. The system of claim 8, wherein the processor is further configured, when propagating the determination of validity to the subset of nodes, to:
identify confidential information in data to be propagated; and
obscure the confidential data from the data to be propagated.

11. A non-transitory computer-readable medium with instructions encoded thereon for implementing distributed processing in edge nodes, the instructions comprising instructions to:
for each respective edge node of a plurality of edge nodes:
receive, at the respective edge node, data from a client of the respective edge node;
store the received data to memory of the respective edge node;
generate, at the respective edge node, a prediction of a respective activity based on the data;
determine, at the respective edge node, whether the prediction is valid by feeding the prediction into a machine learning model and receiving a validation response from the machine learning model, wherein the machine learning model is generated by:
identifying a subset of the plurality of edge nodes comprising common attributes that are common with respect to attributes of the respective edge node;
retrieving respective models for each respective edge node of the subset;
weighting aspects of each respective model;
ranking each respective aspect of each respective model based on the weighting; and
initializing the machine learning model for the respective edge node by generating a machine learning model comprising aspects selected based on the ranking;
feed the received data as training data to the machine learning model;
responsive to having trained the machine learning model using the received data, delete the received data from the memory of the respective edge node; and
in response to determining that the prediction is valid, activate, at the respective edge node, a function.

12. The non-transitory computer-readable medium of claim 11, wherein the machine learning model comprises a reinforced learning model.

13. A non-transitory computer-readable medium with instructions encoded thereon for implementing distributed processing in edge nodes, the instructions comprising instructions to:
for each respective edge node of a plurality of edge nodes:
receive, at the respective edge node, data from a client of the respective edge node;
store the received data to memory of the respective edge node;
generate, at the respective edge node, a prediction of a respective activity based on the data;
determine, at the respective edge node, whether the prediction is valid by feeding the prediction into a machine learning model and receiving a validation response from the machine learning model;
feed the received data as training data to the machine learning model;
responsive to having trained the machine learning model using the received data, delete the received data from the memory of the respective edge node;
in response to determining that the prediction is valid, activate, at the respective node, a function;
in response to determining that the prediction is valid, determine whether the respective activity is novel;
in response to determining that the respective activity is novel:
identify a subset of nodes that correlate to the respective node; and
propagate the determination of validity to the subset of nodes.

14. The non-transitory computer-readable medium of claim 11, wherein the instructions to propagate the determination of validity to the subset of nodes further comprise instructions to:
identify confidential information in data to be propagated; and
obscure the confidential data from the data to be propagated.

* * * * *